United States Patent [19]
Brunell et al.

[11] 3,946,801
[45] Mar. 30, 1976

[54] RECUPERATOR

[75] Inventors: Richard L. Brunell, Scio; Jerry J. Wright, Wellsville, both of N.Y.

[73] Assignee: The Air Preheater Company, Inc., Wellsville, N.Y.

[22] Filed: Aug. 8, 1974

[21] Appl. No.: 495,610

[52] U.S. Cl. ......... 165/32; 60/39.51 R; 126/116 A; 165/134; 236/20 R
[51] Int. Cl.² ..... F02C 7/08; F02C 7/32; F02C 7/34
[58] Field of Search ........... 60/39.51 R; 126/116 A, 126/110 R, 116 R; 236/20, 1 E; 165/39, 32, 134

[56] References Cited
UNITED STATES PATENTS

| | | | |
|---|---|---|---|
| 2,284,138 | 5/1942 | Evans et al. | 126/116 A |
| 2,331,219 | 10/1943 | Mueller et al. | 126/116 A |
| 2,418,182 | 4/1947 | McCollum | 126/116 A |
| 2,525,400 | 10/1950 | Crawford | 126/116 A |
| 2,605,610 | 8/1952 | Hermitte et al. | 60/39.51 R |
| 2,646,209 | 7/1953 | Galliot | 60/39.51 R |
| 2,663,144 | 12/1953 | Nordstrom et al. | 60/39.51 R |
| 2,717,581 | 9/1955 | Edwards | 236/20 |
| 2,859,954 | 11/1958 | Grey | 60/39.51 R |

*Primary Examiner*—Albert W. Davis, Jr.
*Assistant Examiner*—Sheldon Richter
*Attorney, Agent, or Firm*—Wayne H. Lang

[57] ABSTRACT

A recuperative heat exchanger for a gas turbine or similar source of intermittent heat having an auxiliary heating unit that provides heat to maintain the heat exchanger at a substantially constant temperature when heat being exhausted from the gas turbine varies. Included also are controls that vary the supply of heat being given off by the auxiliary heating unit to compensate for changing operating conditions and provide a gradual heating or cooling of the unit to preclude thermal distortion and structural damage from an unstable temperature.

3 Claims, 1 Drawing Figure

U.S. Patent   March 30, 1976   3,946,801
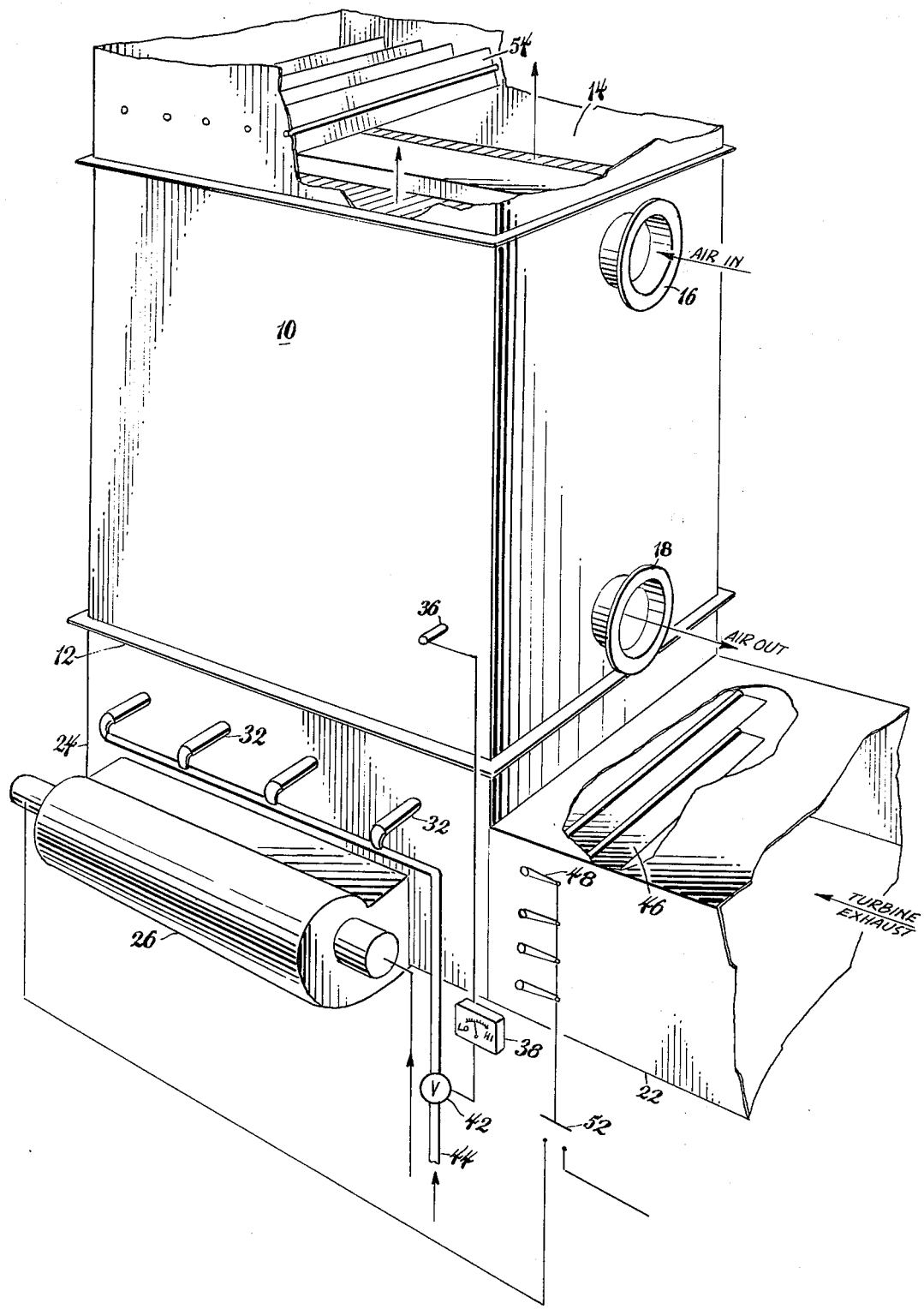

RECUPERATOR

BACKGROUND OF THE INVENTION

Recuperative heat exchangers such as those being used in conjunction with gas turbines operate most effectively and have a minimum amount of thermal distortion when they are maintained at an even temperature. Accordingly, the present invention is directed to a recuperative type heat exchanger that includes supplemental heating means to maintain the temperature thereof at a continuously high temperature irrespective of operating conditions that prevail in the gas turbine.

SUMMARY OF THE INVENTION

The present invention therefore relates to a recuperative heat exchange apparatus used in conjunction with a gas turbine. More particularly, the specific arrangement here defined combines an independently fired heating unit with a recuperative heat exchanger being used for gas turbine operation wherein the heating unit is adapted to supply a quantity of heat necessary to maintain a constant temperature therein when operation of the gas turbine varies.

The apparatus would include all controls necessary to vary the output from the heating unit as required to provide a quantity of heat that supplements the heat being supplied by the gas turbine to provide stable temperature and a continuously high effectiveness.

The heat exchanger also includes all the controls necessary to provide a programmed increase or decrease of temperature at a reduced rate whereby "start-up" or "shut-down" conditions would produce a minimum of thermal distortion within the heat exchanger.

BRIEF DESCRIPTION OF THE DRAWING

A more complete understanding of our invention may be realized by referring to the following description in conjunction with the accompanying drawings in which:

The FIGURE is a perspective view of a combined heat exchanger and heating unit.

DESCRIPTION OF THE PREFERRED EMBODIMENT

The invention generally defines an arrangement that includes a heat exchange device in combination with a unit heater whereby heat from the heater is supplied to the heat exchanger to maintain it at a uniform operating temperature.

More specifically, the heat exchanger includes a housing 10 having an inlet 12 for hot fluid and an outlet 14 for the exhaust of cooled fluid after it has passed in contact with a fluid to be heated. The fluid to be heated, such as cool air, enters the heat exchanger through an air inlet 16 and is exhausted through outlet 18 after having passed in heat exchange relation with the heating fluid.

The usual source of heating fluid is an exhaust duct 22 from a gas turbine or the like whereby the hot gases may be directed to the inlet 12 of the housing 10.

A transition duct 24 intermediate the exhaust duct 22 and the heat exchanger 10 includes a blower 26 arranged to draw ambient air through inlet 28 and exhaust it into the inlet 12 of the heat exchanger.

Inasmuch as turbine exhaust gas being delivered to the heat exchanger through exhaust duct 22 may quickly vary from very hot to very cold, special heating means 32 are provided in transition duct 24 to provide supplemental heat. Heating means 32 are preferably direct-fired, fuel burning air heaters of any convenient form having a predetermined supply of fuel and air, however electric resistance heaters or other type of independent heating unit may be utilized without resorting to invention inasmuch as a continuous supply of heat from any source would have the same effect upon the adjacent heat exchanger.

When activated, the heating units 32 are adapted to quickly off a quantity of heat that is absorbed by the turbine exhaust gas and subsequently directed through the heat exchanger at approximately the same temperature as gas which is being exhausted through duct 22 when it is operating at normal temperature.

Means which activates the heating unit and maintains it at a predetermined temperature for a given period of time comprises one or more thermocouples 36 preferably positioned in the heat exchanger housing 10 and made responsive to the temperature of the turbine exhaust flowing therethrough. The thermocouples may be set by a controller 38 that controls valve 42 in the fuel line 44 to maintain the temperature of the heating fluid and thermocouple 36 at their "SET" temperature. By this arrangement any fluctuation in temperature of the heating fluid will be immediately compensated for inversely by an increase or decrease of the heating means 32 whereby an increase in temperature of the turbine exhaust will provide for a decrease in output from the heating means, and conversely, a decrease in temperature of the turbine exhaust will call for an increase in output from the heating means.

Prior to "start-up" of the apparatus the controller 38 would be set at "LOW" to provide minimum heat to burners 32 and to the housing 10. The controller 38 would then be slowly raised from LOW to HIGH to supply an increased amount of heat to housing 10 until it would approximate the temperature of the normal turbine exhaust. The turbine (not shown) would then be activated and a full blast of high temperature turbine exhaust gas in duct 22 would produce a minimum amount of the thermal shock on the already hot heat exchange apparatus.

Shut-down of the apparatus would require a reverse procedure in that movement of the controller 38 slowly from HIGH to LOW would be effected to supply a decreasing amount of heat to housing 10 whereby the entire heat exchanger would be cooled slowly and there would be a minimum of thermal shock accompanying an abrupt termination of the gas turbine. The control means 38 described herein may be readily modified by the use of an automatic timing device of the type disclosed by U.S. Pat. No. 3,724,401.

To facilitate thorough and rapid heating of the heat exchange apparatus in the absence of a normal stream of hot exhaust gas being supplied through duct 22, a damper arrangement 46 is provided with actuators 48 whereby closure of the dampers will isolate the turbine exhaust from the transition duct 24.

As the actuators 48 are closed, a switch 52 is similarly closed to activate the blower 26 whereby a flow of ambient air is supplied to the heat exchanger by the heating means 32 and circulated to all parts of the heat exchanger so as to maintain a constant temperature therein.

Although considered not essential to successful operation, a second damper means 54 at the outlet of the heat exchanger and actuated similarly thereto will permit closure of both dampers 46 and 54 to produce a "bottled-up" effect whereby a minimum amount of heat from heating means 32 will produce a more uniform heat throughout the heat exchanger.

The invention described herein and illustrated in the accompanying drawings is believed to admit to various modifications within the ability of persons skilled in the art, and all such modifications are considered to lie within the spirit and scope of the appended claims.

We claim:

1. Heat exchange apparatus that provides supplemental heating of the heat exchange structure including means that retard a change of temperature to obviate thermal shock thereof comprising in combination a housing having an inlet and an outlet for a heating fluid, inlet and outlet ducts in said housing that direct a fluid to be heated in heat exchange relation with the heating fluid, auxiliary heat generating means connected to the inlet for the heating fluid, means responsive to the temperature of the heating fluid, and means responsive to said temperature responsive means controlling the auxiliary heat generating means whereby the auxiliary heat generating means varies in accordance with the temperature of the heating fluid.

2. Heat exchange apparatus as defined in claim 1 wherein the means controlling the auxiliary heat generating means is inversely proportional to the temperature at the inlet whereby the temperature of the air heated by the heat generating means increases as the temperature of the heating fluid decreases.

3. Heat exchange apparatus as defined in claim 1 including a timing device that controls the auxiliary heat generating means.

* * * * *